(12) United States Patent
Bietsch et al.

(10) Patent No.: US 6,798,464 B2
(45) Date of Patent: Sep. 28, 2004

(54) LIQUID CRYSTAL DISPLAY

(75) Inventors: Alexander Bietsch, Thalwil (CH); Emmanuel Delamarche, Adliswil (CH); Bruno Michel, Adliswil (CH); Heinz Schmid, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 10/063,781

(22) Filed: May 13, 2002

(65) Prior Publication Data

US 2002/0167619 A1 Nov. 14, 2002

(30) Foreign Application Priority Data

May 11, 2001 (EP) .......................................... 01810462

(51) Int. Cl.[7] .......................................... G02F 1/1335
(52) U.S. Cl. ...................... 349/12; 349/158; 349/141
(58) Field of Search ............................ 349/12, 110, 111, 349/141, 143, 158

(56) References Cited

U.S. PATENT DOCUMENTS

| | | | |
|---|---|---|---|
| 4,527,862 A | 7/1985 | Arakawa | 349/12 |
| 5,131,065 A | 7/1992 | Briggs et al. | 385/120 |
| 5,293,564 A | 3/1994 | Sukegawa et al. | 365/200 |
| 5,455,899 A | 10/1995 | Forslund | 395/140 |
| 5,512,131 A | 4/1996 | Kumar et al. | 156/655.1 |
| 5,669,303 A | 9/1997 | Maracas et al. | 101/327 |
| 5,725,788 A | 3/1998 | Maracas et al. | 216/41 |
| 5,727,977 A | 3/1998 | Maracas et al. | 445/24 |
| 5,900,160 A | 5/1999 | Whitesides et al. | 216/41 |
| 5,925,259 A | 7/1999 | Biebuyck et al. | 216/2 |
| 6,048,623 A | 4/2000 | Everhart et al. | 428/464 |
| 6,060,121 A | 5/2000 | Hidber et al. | 427/261 |
| 6,388,729 B2 | 5/2002 | Ahn et al. | 349/190 |
| 6,512,503 B1 | 1/2003 | Kim et al. | 345/87 |
| 6,727,969 B2 | 4/2004 | Chang et al. | 349/143 |

FOREIGN PATENT DOCUMENTS

| | | | |
|---|---|---|---|
| EP | 0 969 517 A1 | 1/2000 | H01L/31/0224 |
| JP | 011-43246 | 2/1999 | |
| WO | WO 99/59024 | 11/1999 | G02F/1/1343 |

OTHER PUBLICATIONS

Abbott et al., "Orientation of liquid crystals on self–assembled monolayers formed from alkanethiols on gold" in ACS Symp. 695, pp. 81–102 (1998).
D. Armitage, "Alignment of liquid crystal on polarizing metal film" in Appl. Phys. Lett. 56,pp. 1723–1724 (1990).
SID Symposium 1998, p. 199.
R.W. Sabris, "Color filter technology for liquid crystal displays",Dislays 20, 1999, pp. 119–129.

(List continued on next page.)

Primary Examiner—James A. Dudek
(74) Attorney, Agent, or Firm—Ido Tuchman; Derek S. Jennings

(57) ABSTRACT

A liquid crystal display device includes a substantially transparent substrate layer between a grating layer and a pixel electrode that comprises a solid conductor and an electrically conductive mesh. The device also includes a liquid crystal layer between said pixel electrode and a substantially transparent counter electrode that is arranged at a transparent cover plate. It further includes an active circuit element layer with a field effect transistor for controlling the pixel electrode. A method for manufacturing the liquid crystal display device is further disclosed wherein the pixel electrode is formed by printing a patterned substance onto the substrate layer and selectively plating a conductor onto said substance. The device may also comprise a conductor mesh comprising rows of conductor lines crossing with columns of conductor lines, wherein at least part of the conductor lines are randomly spaced from each other.

16 Claims, 15 Drawing Sheets

OTHER PUBLICATIONS

Adams et al., "Printing Technology" 4th ed. Delmar Publishers, Albany, 1996.

Younan Xia amd G.M. Whitesides,"Soft Lithography," Angew. Chem. Int. Ed., 1998, 37,pp. 550–575.

E. Delamarche et al., "Transport mechnaisms of alkanethiols during microcontact printing on gold," The Journal of Physical Chemistry B, vol. 102, no. 18, pp. 3324–3334.

H. Schmid and B. Michel "Siloxane polymers for high–resolution, high–accuracy soft lithography", Macrmolecules, vol. 33, No. 8, pp. 3042–3049.

Bietsch and Michel, "Conformal contact and pattern stability of stamps used for soft lithography", J. Appl. Phys., 88, pp. 4310–4318 (2000).

H. Biebuyck et al. in "Lithography beyond light: microcontact printing with monlayer resists", IBM J. Res.Develop., vol. 41, No. 1/2, Jan./Mar. 1997, pp. 159–170.

H. Kind, M. Geissler, H. Schmid, B. Michel, K. Keren, and E. Dealmarche "Patterned electroless deposition of copper by microcontact printing pallidium (II) complexes on titanium covered surfaces", Langmuir 16 (16), p. 6367–6373 (2000).

Seitz, "Die Wirkung eines unendlich langen Metall–zylinders auf Hertzsche Wellen," (Ann. d. Phys. (4), 16, 746 (1905).

Seitz, "Die Wurking eines unendlich langen Metall–zylinders auf Hertzsche Wellen II," (Ann. d. Phys., 19, p. 554–566 (1906).

Ignatowsky, "Reflexion elektromagnetischer Wellen an einem Draht," Ann d. Physik (4), 18, p. 495 (1905).

Schaefer and Grossmann "Untersuchungen uber die Beugung elektromagnetischer Wellen an dielektrischen Aylindern," (Ann. d. Phys. (4), 31, p. 455–499 (1910).

LIQUID CRYSTAL DISPLAY

BACKGROUND OF INVENTION

The present invention concerns a liquid crystal display device, display screens based on this structure, and a method for making such display screens.

The dramatic growth of the liquid crystal display (LCD) market has been mainly fueled by the strong demand for flat and lightweight color displays in notebook computers. High quality LCD displays require an active driving of pixel electrodes with thin film transistors (TFT) which are, however, costly to produce. This prevented so far spreading of LCD displays in the monitor and television market.

A display screen is an electro optical device to make data or images appear on a monitor or on a front end device. Most display screens work with the same principle as today's television screens using a cathode ray tube (CRT). Flat panel liquid crystal displays (LCD) are thin display screens that are used in a broad range of fixed and mobile devices like appliances, mobile phones, CD players, personal digital assistants and portable computers because they have a smaller geometric form factor and lower weight. More recently the brilliance, color saturation and pixel resolution of LCD displays have been improved so that they start to challenge CRT and other types of displays used in desktop monitors and television sets.

Nearly all modern flat panel displays use LCD technologies. LCDs utilize two sheets of polarizing material with a liquid crystal (LC) solution between them. An electrical field applied between electrodes across the liquid causes the crystals to align vertically so that the polarizing plane of the light is no longer rotated by 90 degrees and thus prevents the light from passing through the crossed polarizing sheets. Each cell, defined by the top and bottom electrode therefor, is like a shutter or valve either allowing light to pass through or blocking the light. Liquid crystals generally assume a restricted set of orientations with respect to a surface. This phenomenon, called anchoring, is the result of orientation dependent interactions between the surface and the liquid crystal. The control of the orientation in LCDs is central to the operation of all displays. A substantial amount of effort has been directed to deploy reproducible methods. Rubbing of a polyimide sheet is one known approach being employed to control the orientation.

Self assembled monolayers (SAM) of linear alkanethiols on metals like gold (Au), silver (Ag), and copper (Cu) or of linear phosphoric acid molecules on conductor oxides, e.g. nickel oxide, confer a remarkable level of control over structure and chemical functionality of their surface. In a publication entitled "Orientations of Liquid Crystals on Self assembled Monolayers Formed from Alkanethiols on Gold" in ACS Symp. 695, pp. 81 102 (1998), by Abbott et al. it is shown that unlike pure conductor surfaces, SAM covered surfaces direct liquid crystals to a planar anchoring, for SAMs formed from molecules longer than twelve carbon atoms. Azimutal ordering of the liquid crystal domains is introduced by formation of SAMs on Au films that are created by oblique or tilted evaporation. An external orientation parameter, the oblique evaporation, is needed to turn the system into a macroscopic light valve for display devices. The azimutal direction of liquid crystal alignment is perpendicular to the evaporation direction for SAMs with even numbers of carbons in their chain and parallel for SAMs with odd numbers of carbons in their chain. The mechanism for the alignment is the preferential roughness created by the oblique evaporation, a result also apparent from "Alignment of liquid crystal on a Polarizing Metal Film" in Appl. Phys. Lett. 56, pp. 1723 1724 (1990) by D. Armitage. Metal layers in both referenced papers are only partially transparent thus precluding manufacturing of commercially useful displays with high brightness.

Switching of one liquid crystal cell from the planar anchored status, i.e. where the plane of polarization is rotated by 90 degrees to the homeotropic status, i.e. no rotation, uses the application of an electrical field, as stated above. This can also be extended to an array of cells as it is found in a simple small monochrome display. In such a case each pixel is addressed for a short time only by a potential difference applied to its column and row. This passive matrix approach is simple, but due to the limited time available to address each pixel it creates visible artifacts and cannot be used to drive large high quality arrays.

Large LCD arrays are better controlled by an active matrix approach. Here each pixel is driven by a thin film transistor (TFT) that charges the pixel capacitor during the time it is switched on and isolates charge during the time other pixels are addressed. This active matrix display produces images with higher quality and is also capable to drive the threefold larger arrays needed for color images. In fact, the image quality of active matrix TFT LCD color displays can easily compete with CRT displays because refresh rates are higher. The TFT technology provides the best resolution of all flat panel techniques but is also the most expensive.

Color liquid crystal displays consist of several hundred thousands to millions of pixels, and each pixel consists of three sub pixels that separately control R (red), G (green), and B (blue). A color filter is used for each sub pixel in order to display RGB, so a full color image can be obtained by combining such sub pixel displays. In such a case, only one third of the light can be utilized. Color can also be generated by separating white light into R, G, and B by a prism or a grating. To get a full color image each color is then gated separately by a subset of a pixel triplet. In SID Symposium 1998, p. 199, a method is proposed wherein, as a liquid crystal projector, arc lamp light is reflected on a diffraction grating surface to be separated into RGB light, collected by a microlens array and have its transparency controlled by a liquid crystal layer for each sub pixel.

LCD screens use backlight so that they are visible in the dark and show a higher contrast in bright environments. Space requirements of the backlight in portable displays are tight so that no far field projection is used. Instead, typical backlights are composed of a linear light source at the side of the display that feeds light into a planar light guide that illuminates the whole display area homogeneously. Backlights used to date emit light with a large opening angle which is welcome to provide a good viewing angle for the user but prevents use of the light separation protocol described above. In the Japanese patent application Nr. 011 43246, of Feb 2, 1999 entitled "Transparent Type Liquid Crystal Display", a type of substrate is described that creates parallel light which is separated by means of a grating into RGB light. R, G, and B are emitted under slightly different angles onto a microlens array and focused onto the respective LCD pixels. Having passed a first polarizer sheet, the liquid crystal layer, and a second polarizer the light needs to be diffused again to create a homogenous angle independent color for the viewer.

The fabrication costs of displays are directly proportional to the number of the lithographic layers, the number of vacuum deposition steps, and the overall number of assembly steps. A passive matrix display needs assembly of two crossed polarizers, two transparent plates with patterned ITO electrodes possibly with an additional conductor black matrix, two rubbed layers of polyimide, and when color is needed an additional sheet containing patterned RGB color filters. For active matrix displays the fabrication costs of TFTs currently push up the overall cost by a large factor, because TFTs are fabricated using a four to seven mask process and either a Co or an Al gate metallization.

In a conventional LCD, the liquid crystal material is placed in a homogeneous electric field between the two transparent electrodes. The light propagates from a backlight source through a bottom transparent plate, a first transparent electrode made of indium tin oxide (ITO), an insulating layer, the liquid crystal molecules, a top electrode and a top transparent plate. Manufacturing of the transparent ITO bottom electrode requires one lithography step and one vacuum step. ITO is the material of choice for electrodes because it is one of the few transparent conducting materials that can be processed technologically. Typically, pixel electrodes are made from 50 nm thick ITO. At this thickness the ITO absorbs between 6 and 16% of the incident light. Metals, and copper in particular, although they can efficiently conduct currents, are not adequate for transparent electrodes because they strongly absorb the light much before a conducting layer is realized.

Metal meshes with dimensions of the order of several microns have already been suggested as highly conductive structures to reduce the relative high resistance of a transparent conductor like ITO. Examples are described in U.S. Pat. Nos. 5,293,564, 5,455,899, and 5,131,065. Their strong optical diffraction, however, precludes their use in useful display devices. Gratings or other structures with a regular pitch of the order of the wavelength, i.e. 0.1 20 microns, typically show strong diffraction. The patent application WO 99/59024 "Display Substrate Electrodes with Auxiliary Metal Layers for Enhanced Conductivity" describes several processes for self aligned deposition of additional conductor layers onto ITO to improve the overall conduction. The first two preferred embodiments show how conductor wires can be added laterally to ITO areas. A third and fourth embodiment describe how periodic arrays of holes, triangles, squares, and hexagons, can be used to define electrodes with improved conductivity. The analysis concludes with an assessment of the percentage of light transmitted being proportional to the area density of the openings.

Transparent electrodes made from metals can be made by use of a mesh of wires, as described in EP 0 969 517 A1. The disadvantage of meshes is their strong tendency for light scattering and their visibility to the human eye. This is the main reason why such mesh electrodes have not been used for LCDs so far. When the mesh is made finer and finer, the pattern eventually becomes invisible to the viewer's eye. Such a mesh electrode will then be perceived as a partially transparent surface with the ratio of conductor to the ratio of glass determining the transmission ratio.

The size of the conductor mesh described in WO 99/59024 is relatively large because the uniformity of the electric field across the LCD pixel is guaranteed by the presence of the ITO in the openings. Elimination of the ITO while maintaining the homogeneity of the electric field requires a much smaller size of the arrays with holes being smaller than one or two micrometers. It is known from optics, that periodic arrays of structures diffract light and create intensively colored higher order beams that disturb the normal operation of the display, i.e. white light is separated into the rainbow colors and different colors are seen from the same pixel under different angles of observation. Diffractive phenomena are observed for structures that are periodic within the coherence length of light, typically 10 microns for white light that underwent several reflections in a backlight.

Transmission ratios of 80 90% require the lines forming the mesh to be at least 10 times smaller than their repeat distance. Both the resolution of the human eye and the field homogeneity dictate repeat distances below 1 micrometer. This results in a line width of the order below 100 nm. Traditionally, lithography used for display fabrication can reproduce patterns of the order of 10 microns with an overlay accuracy of the order of 1 mm. Currently, the lithography costs for LCD manufacturing at sub micron scales are not affordable because of a lack of low cost patterning methods that can reproduce such dimensions.

Usually color separators or color filters sit below the LCD color glass plate which means that the separator is in contact with the liquid crystal (liquid crystal) fluid. It is a disadvantage of this known approach that the conventional color filters have to be passivated such that they do not contaminate the liquid crystal. The conventional color filters are usually made by dyeing, pigment dispersion, printing or electro deposition, as described in the article "Color filter technology for liquid crystal displays", R. W. Sabnis, Displays 20, 1999, pp. 119 129.

A basic lithographical method is described in "Printing Technology" 4th ed. Delamare Publishers, Albany, 1996. Details about novel applications are for instance given in the publication "Soft Lithography", by Younan Xia and G. M. Whitesides, Angew. Chem, Int. Ed, 1998, 37, pp. 550 575 and in the U.S. Pat. Nos. 5,512,131, 5,900,160, 6,048,623, and 6,060,121. Other US patents that describe soft lithography are: U.S. Pat. Nos. 5,669,303, 5,725,788, and 5,727,977.

High resolution printing is an alternative approach to conventional lithography. Several parameters important for accurate and defect less patterns have been identified and controlled, as described in "Transport Mechanisms of Alkanethiols during Microcontact Printing on Gold", E. Delamarche et al., The Journal of Physical Chemistry B, Vol. 102, No. 18, pp. 3324 3334. Issues that are being studied to be able to replicate arbitrary patterns of small and large dimensions are polymer mechanics and overlay accuracy of the stamp, addressed by H. Schmid and B. Michel in the article "Siloxane Polymers for High Resolution, High Accuracy Soft Lithography", Macromolecules, Vol. 33, No. 8, pp. 3042 3049 and by Bietsch and Michel, J. Appl. Phys., 88, pp. 4310 4318 (2000). Ink diffusion is another issue that is dealt with by E. Delamarche et al. in the above mentioned paper. The surface chemistry to allow easy separation of stamps from master and substrate is described by H. Biebuyck et al. in "Lithography beyond light: Microcontact printing with monolayer resists", IBM J. Res. Develop., Vol. 41, No. 1/2, January/March 1997, pp. 159 169. Recently, microcontact printing has been extended to chemically amplified printing where a catalytically active molecule is printed onto a substrate, as described by H. Kind, M. Geissler, H. Schmid, B. Michel, K. Kern, and E. Delamarche in "Patterned Electroless Deposition of Copper by Microcontact Printing Palladium (II) Complexes on Titanium Covered Surfaces", Langmuir 16 (16), p. 6373 (2000).

The theory of Mie explains the scattering of a planar monochromatic wave by a homogeneous sphere of any diameter and of any composition situated in a homogeneous medium. An equivalent solution exists from Debye. Simple calculations using the Huygens Kirchhoff theory allow the prediction of light intensity of individual scatterers as function of viewing angle (theta) and as function of the size of a scatterer. Scattering of light by long circular cylinders has been studied by Seitz and Ignatowsky (Ann. d. Phys. (4), 16, 746 (1905); ibid., 19, p. 554 (1906); Ann. d. Physik (4), 18, p. 495 (1905)) and Schaeffer and Grossmann (Ann. d. Phys. (4), 31, p. 455 (1910)): the formulas are similar to those of Mie relating to the sphere for the scattering circle perpendicular to the axis of the cylinder. Diffraction or scattering can be extended from a single sphere or cylinder to a system with any number of objects provided they are randomly distributed within the coherence length of the light used and separated from each other by distances that are large compared to the wavelength.

In U.S. Pat. No. 5,925,259 a process for producing lithographic features in a substrate layer is described, comprising the steps of lowering a stamp carrying a reactant onto a substrate, confining the subsequent reaction to the desired pattern, lifting the stamp and removing the debris of the reaction from the substrate. Preferably, the stamp carries the pattern to be etched or depressions corresponding to such a pattern. Using these methods, patterns with submicron features can be generated.

A beneficial effect that comes into play when mesh openings are smaller than the wavelength of the light is the forward scattering effect, as addressed in the above mentioned European patent application EP 0 969 517 A1.

SUMMARY OF INVENTION

It is a feature of the present invention to provide a new display structure.

It is another feature of the present invention to provide new displays based on this display structure.

It is yet another feature of the present invention to provide a method for making such new displays.

The present invention provides a liquid crystal display device, a method for making such a liquid crystal display device, and a display device. Furthermore, the present invention provides a conductor mesh for use in displays.

One embodiment of a liquid crystal display device includes a grating layer, a transparent substrate layer, a pixel electrode, and an active circuit element layer with a field effect transistor. The liquid crystal display device further includes a liquid crystal layer, a counter electrode, and a transparent cover plate. Light emitted by a light source travels through the liquid crystal display device.

BRIEF DESCRIPTION OF DRAWINGS

FIG. 8b shows a diagram showing the light intensity profile of the structure of FIG. 8a.

FIG. 8c shows a diagram showing the wavelength selectivity of the structure of FIG. 8a.

DETAILED DESCRIPTION

Figure 1:
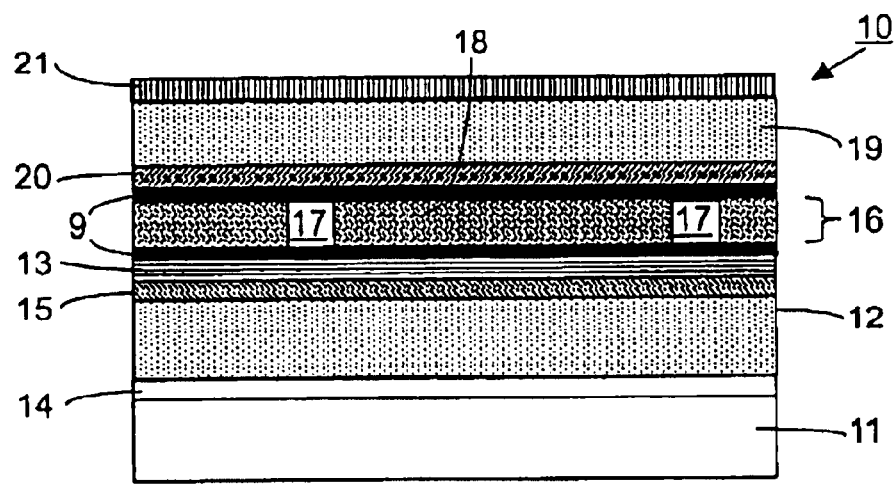
FIG. 1 shows a schematic cross section of an LCD structure.

In FIG. 1 is shown a first embodiment of a transparent type twisted nematic LCD structure 10, also referred to as liquid crystal display device. It comprises a linear or planar light source 11, also referred to as backlight, that emits light at multiple wavelengths, which is coupled into layers above the backlight 11. The layers comprise a transparent substrate 12 that is situated upon a grating layer 14, e.g. a conductor grating, which serves as a color separator. The color separator 14 separates the multiple light waves emitted by the light source 11 into three wavelength bands, R for red, G for green, and B for blue. The transparent substrate 12 further carries a conductor layer 15 and in the case of a TFT LCD an active circuit element layer 13 for controlling pixel electrodes of the LCD structure 10. This active circuit element layer 13 has between 3 and 7 semiconductor, insulator, and metallization layers in case of an active matrix TFT LCD display. The conductor layer 15 contains metallic lanes that serve as pixel lines in case of a passive matrix LCD or gate lines in case of a TFT LCD but also comprises areas with conductor meshes (not visible in FIG. 1) serving as electrodes and polarizers. These conductor meshes are herein referred to as bottom polarizer or wire grid polarizer. A polarizer is a filter that only allows light whose electro magnetic waves are oriented in one specific direction to travel through. The polarizing capability is known to improve the contrast in sunglasses and in cameras. Metal wire grid polarizers are known in infrared and microwave applications to selectively transmit only electromagnetic waves with one polarization direction.

The grating layer, which serves as a color separator, can be realized as a conductor or polymer grating splitting the light into three wavelength bands of light. These wavelength bands penetrate the substrate layer and travel through the pixel electrode, the liquid crystal layer, the counter electrode, and the transparent cover plate. Other embodiments are addressed in the detailed description.

The cost associated with the production of TFT LCD displays can be substantially reduced with the proposed LCD structure and the method of making the same. The performance of passive matrix displays can be improved to allow a wider field of application of such low cost displays.

Patterned conductor structures can be employed for the transparent pixel electrode, the grating layer, and even for the polarizing function. In addition, a patterned conductor layer can be used as diffuser and to replace polyimide alignment layers. The combining of several such conductor structures leads to a manufacturing process that is less complex and thus less expensive.

Using the schemes presented herein, low cost LCD devices can be made. The presented method allows to make such LCD devices at costs comparable to or below the production costs of CRT tubes. Since the brilliance and resolution of the LCD devices can be equal or superior to CRT tubes, LCDs can be the preferred solution for future displays.

The manufacturing method presented herein allows to eliminate some of the vacuum and lithography steps for making high quality LCD displays; it also eliminates the need for a color filter sheet, for a diffuser sheet, for two alignment layers, and for two polarizer sheets and thus allows to make LCD displays at reduced cost.

The LCD structure 10 comprises two alignment layers 9, a lower alignment layer 9 and an upper alignment layer 9, between which an LCD layer 16 is positioned. This package of layers 9, 16 is positioned upon the active circuit element layer 13. The LCD layer 16 comprises pillars 17, which serve as spacers, and a liquid crystal fluid 18 that comprises bipolar molecules (liquid crystals) which in an OFF state are capable of rotating the polarization direction of the light by 90 degrees. Randomly spaced spacer balls can be arranged instead of the pillars 17. The color separator's surface should be smooth for maximum color purity and minimum dispersion. Contamination of the liquid crystal fluid 18 is not an issue with the structure proposed herein since the grating layer 14 is not in contact with the liquid crystal fluid 18, as illustrated in FIG. 1.

Upon the upper alignment layer 9 and on the bottom side of a transparent cover plate 19, a conductor mesh 20, also referred to as counter electrode, is arranged, serving as top electrode in case of a passive matrix display or as ground electrode in case of a TFT LCD display. The conductor mesh 20 may also serve as a top polarizer. The transparent cover plate 19 forms the upper part of the LCD structure 10. The transparent cover plate 19 and the transparent substrate 12 sandwich the liquid crystal material 18. The transparent cover plate 19 and the transparent substrate 12 may be aligned with respect to each other. The typical distance between them is in the range of a few microns up to 10 microns and more. The twisted nematic LCD structure 10 uses two polarizers, namely the bottom polarizer, formed here by the conductor meshes of the conductor layer 15 and the top polarizer 20.

An optional diffusing or color correction layer 21 is arranged on the upper side of the transparent cover plate 19. Such a diffusing layer 21 improves the LCD structure 10 in that it reduces the directivity of the light emitted. A patterned conductor layer may be used as the diffusing layer 21 and it may comprise conductor particles which evenly distribute (scatter) the light. It is also possible to provide a color correction sheet in the upper part of the LCD structure 10.

A color LCD typically has a large number of pixels where each pixel comprises three sub pixels, one red sub pixel, one green sub pixel, and one blue sub pixel. A color filter absorbs two of the three wavelength bands of the light and thus enables a full color image to be displayed. Such a color filter is not necessary when using the herein described color separator.

Figure 2:
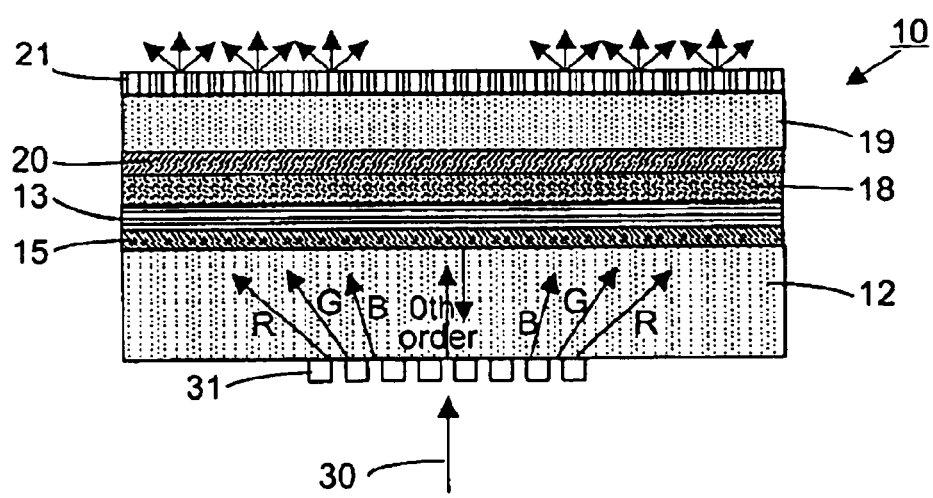
FIG. 2 shows a magnified schematic cross section of the LCD structure of FIG. 1.

The function of the LCD structure 10 is subsequently described in connection with FIG. 2. Some of the constituents of the LCD structure 10 are depicted in a manner that allows to illustrate how the light 30 emitted by the light source 11 (not illustrated in FIG. 2) travels through the LCD structure 10. The grating layer, having reference number 14 in FIG. 1, is depicted here as an array of conductor wires 31. These conductor wires 31 split the light 30 received from the backlight 11 into three wavelength bands R, G, B, as schematically illustrated in FIG. 2. These wavelength bands R, G, B penetrate the transparent substrate 12 and travel through the conductor layer 15 and the active circuit element layer 13. It is advantageous to provide a layer that suppresses the zero order maximum.

The wavelength bands R, G, B are polarized by the conductor meshes of the conductor layer 15 serving as bottom polarizer and enter the liquid crystal fluid 18. The liquid crystal fluid 18 controls the intensity of the transmitted light depending on the local electric field applied between the pixel electrode, i.e. bottom electrode, represented by the conductor layer 15, and the counter electrode, also referred to as top electrode, represented by the conductor mesh 20. The combination of polarizing pixel electrode 15, liquid crystal fluid 18, and polarizing top electrode 20 acts as a proportional switch. The individual pixels are controlled, i.e. switched, by the TFTs sitting in the active circuit element layer 13. In the illustration of FIG. 2, all pixels are switched open so that all wavelength bands R, G, B can travel towards the transparent cover plate 19. In the present embodiment, the light reaches the conductor mesh 20 where only the light with the appropriate polarization can pass. It then travels through the transparent cover plate 19 and is released into the half space above the LCD structure 10. In the present embodiment, there is also the diffusion layer 21, which scatters the light, as illustrated by the bundle of arrows pointing into different directions.

Figure 3:
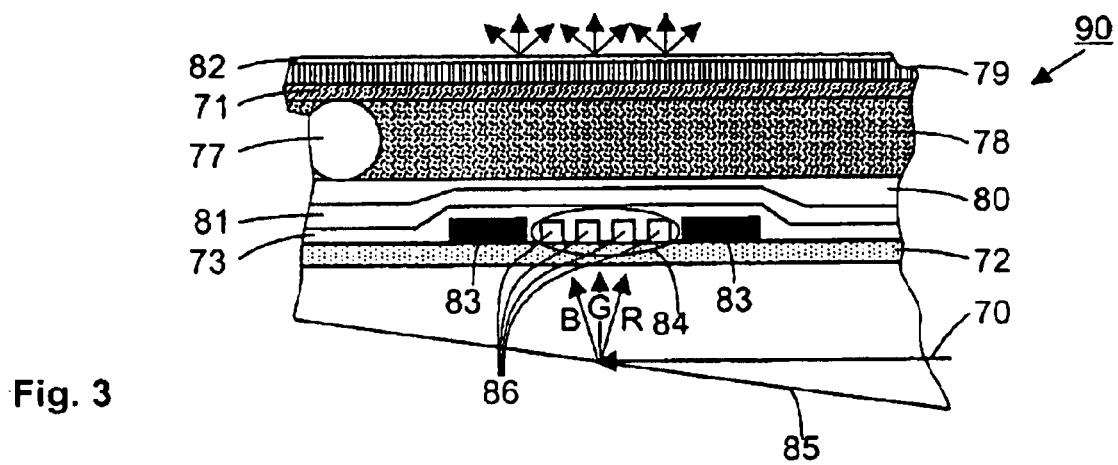
FIG. 3 shows a schematic cross section of an LCD structure with spacer balls.

Another embodiment is illustrated in FIG. 3. An LCD structure 90 receives a lightwave 70 emitted by an edge light source (not visible in FIG. 3). This lightwave 70 is reflected at a sloped plane 85, also referred to as grating layer. The sloped plane 85 may comprise a conductor reflector. The sloped plane 85 comprises a conductor grid, which provides for a diffraction of the lightwave 70 into three wavelength bands (R, G, B) of light, as schematically illustrated in FIG. 3. The LCD structure 90 comprises a transparent substrate 72. A conductor layer is formed on top of the transparent substrate 72 comprising solid conductors 83 in form of lines and open areas 84 with conductor meshes 86 serving as pixel electrodes. One such open area 84 is shown in FIG. 3. The conductor lines 83 block the incident light, whereas the conductor meshes 86 in the open areas 84 allow the light to pass through. The same conductor meshes 86 can also be formed such that they provide for a polarization of the incident light. The conductor lines 83, which serve as gate lines, and the open areas 84 with the conductor meshes 86 are covered by an insulator layer 73, e.g. an oxide layer. A semiconductor layer, e.g. silicon layer 81 covers the oxide layer 73. Source and drain lines are embedded in a data line layer 80. Transistors are hence formed inside the stack of layers 73 to 81. A liquid crystal fluid 78 is situated on the data line layer 80. In the present embodiment, this liquid crystal fluid 78 comprises randomly distributed spacer balls 77. A conductor layer 71 serving as a combination of top electrode and top polarizer is placed above the liquid crystal fluid 78. As in FIG. 1, there is a top transparent plate 79 and a diffusion layer 82 forming the top half of the LCD structure 90.

Manufacturing the described device allows to make patterned conductor structures that serve two or more purposes at once. Such a patterned conductor layer may serve as transparent electrode, grating layer, polarizer, and diffuser, for example. The patterned conductor layer can be manufactured using a high resolution printing technique that is related to flexography. The high resolution printing technique, can be used to make the gate conductor layer for driving the individual TFT gates of an LCD structure. When using high resolution printing, the conventional gate conductor vacuum deposition process can be avoided. High resolution printing is an alternative approach to conventional lithography. This technique has some promising virtues: In its best demonstrations it could pattern 100 nm features and stamps could be fabricated with sub 100 nm stable patterns. Herein, gate conductor patterning is successfully combined with pixel electrode mesh patterning using microcontact printing. Since the geometrical requirements for transparent pixel electrode meshes tolerate small variations in line width, the wires of the pixel electrode mesh need not be accurate in width.

Figure 4A:
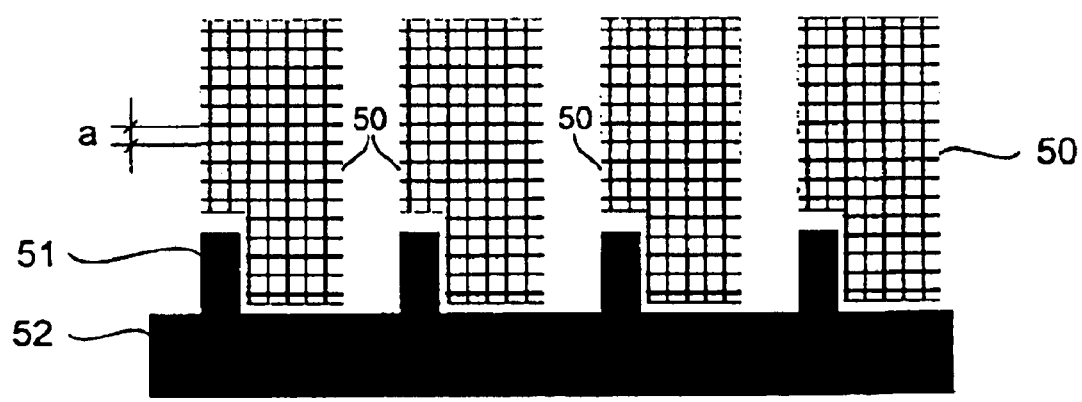
FIG. 4a shows a schematic top view of a gate line and conductor meshes serving as pixel electrode.

In FIG. 4a is illustrated as an embodiment for the pixel electrode on the transparent substrate, a conductor mesh 50 with a mesh size a, and with TFT gates 51 connected to a gate line 52. Occasional breaks in the conductor mesh 50 can be compensated by its two dimensionality.

Figure 4B:
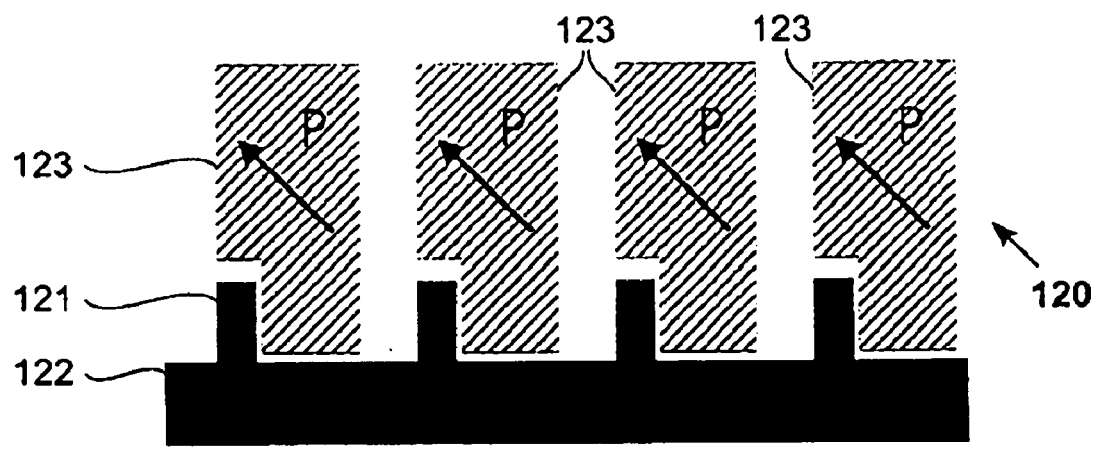
FIG. 4b shows a schematic top view of a gate line and conductor meshes serving as pixel electrode and wire grid polarizer.

In FIG. 4b is depicted a wire grid polarizer electrode 120 that also can be used as the transparent pixel electrode. The wire grid polarizer electrode 120 comprises gates 121 connected to a gate line 122 and a grating area 123 with an array of parallel wires under an angle of 45 degrees to the gate line 122 that is highly transparent to light with one polarization, e.g. TM polarization, and essentially opaque to light with a polarization orthogonal thereto, e.g. TE polarization. The polarization P is indicated by means of arrows.

Figure 4C:
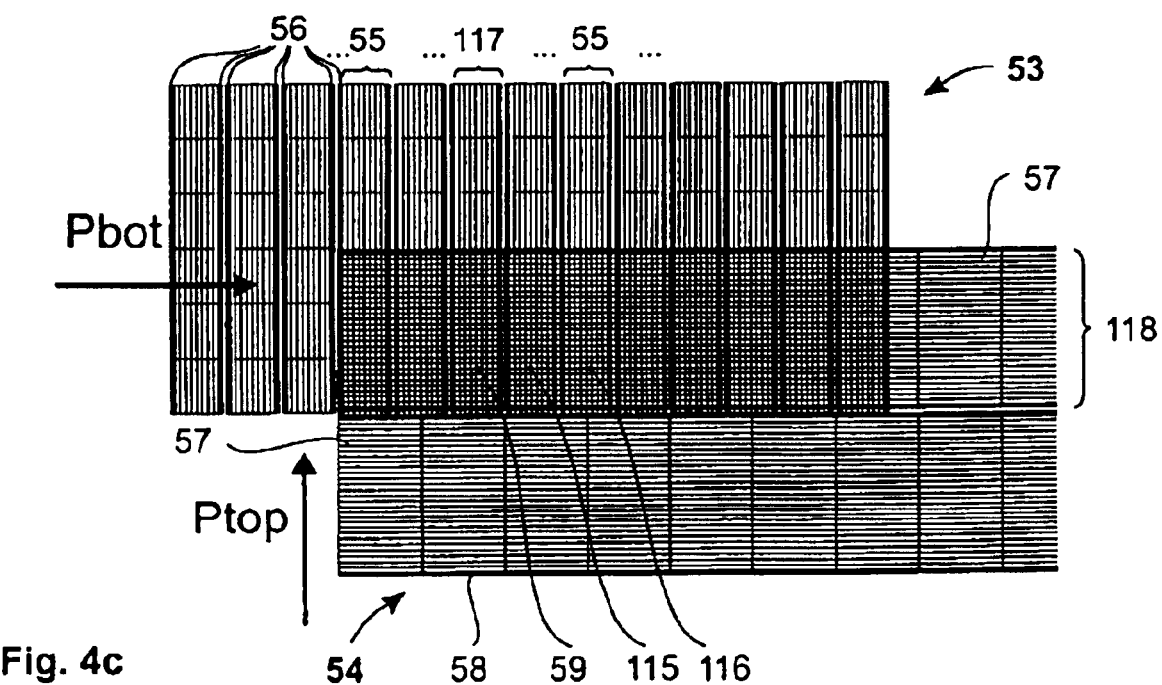
FIG. 4c shows a schematic view of rows and columns of transparent electrodes with polarizer function serving as pixel and as counter electrode.

In FIG. 4c is shown a schematic view of transparent row electrodes 54 and column electrodes 53 with and without a grating polarizer function. The row electrodes 54 are polarizing electrode structures for the bottom polarizer, i.e. the pixel electrode, wherein the polarization direction Pbot is indicated by an arrow, and the column electrodes 53, are polarizing electrode structures for the top polarizer, i.e. the counter electrode with a polarization direction Ptop being orthogonal to the polarization direction Pbot. An intersection between a row electrode 54 and a column electrode 53 defines a single pixel. The electrodes 53, 54 intersect in a central area to form a crossed polarizer. One such column electrode 53 consists of a transparent central area with a conductor grid 55 and an opaque solid peripheral area 56 that masks fringe effects due to field inhomogeneity. In a similar fashion one row electrode 54 also consists of a transparent central area with a conductor grid 57 and an opaque solid peripheral area 58. The row electrode 54 is three times wider than the column electrode 53 because in a color LCD a square pixel is formed among one row and three columns that delineate a red zone 59, green zone 115, and blue zone 116. For a typical twisted nematic LCD alignment, the liquid crystal rotates the light by 90 degrees when no external field is applied and the pixels, i.e. the zones 59, 115, 116, appear transparent. When an electric field is applied to a specific column 117 and a specific row 118 the corresponding pixel 59 becomes opaque.

The relevant figures of merit for the pixel electrode and/or the counter electrode are their average surface coverage and their conductivity. Typical transitivity of conventional ITO pixel electrode materials are between 84 and 96%, depending on the wavelength of the transmitted light. To achieve transitivity of the same order or even better, the lines in a square mesh electrode may be ten times finer than the mesh spacing, i.e. the pitch a, being the distance between two mesh lines. Having a printable line width of about 100 nm results in a pitch a of approximately 1000 nm. However, regularly spaced lines of that dimension are strongly diffractive or, in other words, act as a diffraction grating. A way to reduce diffraction is to space the lines randomly. "Randomly" here means besides the mathematical definition of randomness also to include any form of pseudo randomness.

Figure 5A:
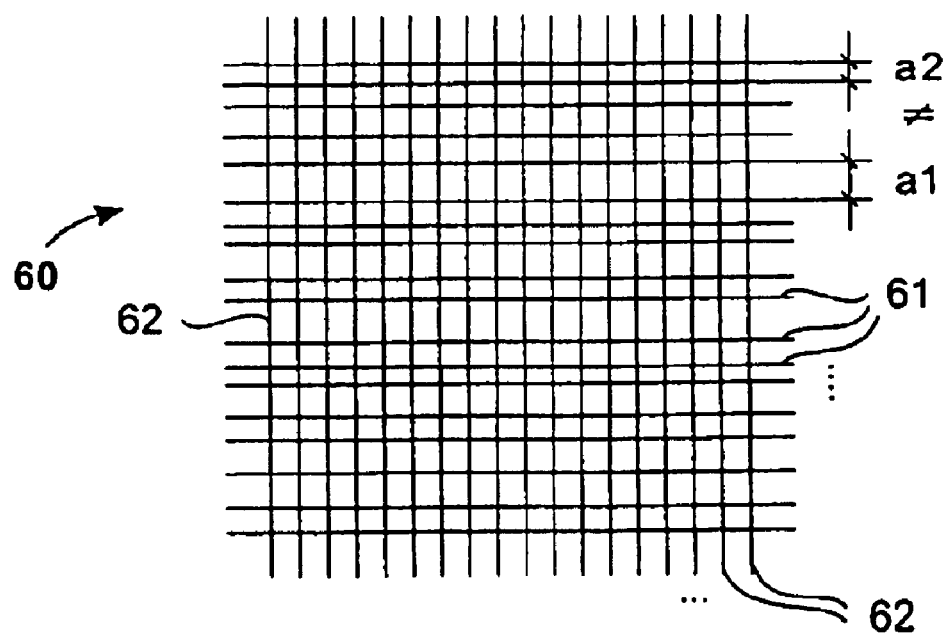
FIG. 5a shows a schematic top view of a conductor mesh with randomly spaced conductor rows.

An example of such a mesh 60 whose lines 61 are placed randomly, is illustrated in FIG. 5a. It can be seen that the spacing of different lines 61 is non uniform, e.g. a1≠a2. The columns 62 of the mesh 60 can be spaced randomly too, if deemed necessary.

The combination of scattering at the randomly spaced mesh cylinders or loops and diffraction induced by locally ordered lattices with different pitch, angle, and duty cycle, which is the ratio between the wire thickness and the opening diameter, thus allows to predetermine or define the angular function of the light emitted towards the user to create a flat intensity distribution in the viewing field and to define a cutoff outside of the viewing field. This definition of the viewing angle can be understood by adding first order diffraction of several lattices with large spacing close to a zero degree viewing angle and those with much smaller spacing that create first order diffraction angles up to a maximal viewing angle. By avoiding very small spacings in the lattice, almost no light will be emitted beyond this maximal angle. By an appropriate combination of locally periodic gratings and scatterers, a flat intensity profile can be achieved over the entire viewing region with a sharp drop beyond, thus defining a cutoff of the light intensity for large angles. More general, arbitrary intensity profiles can be constructed with randomly spaced transparent electrodes that contain localized periodic lattices.

Figure 5B:
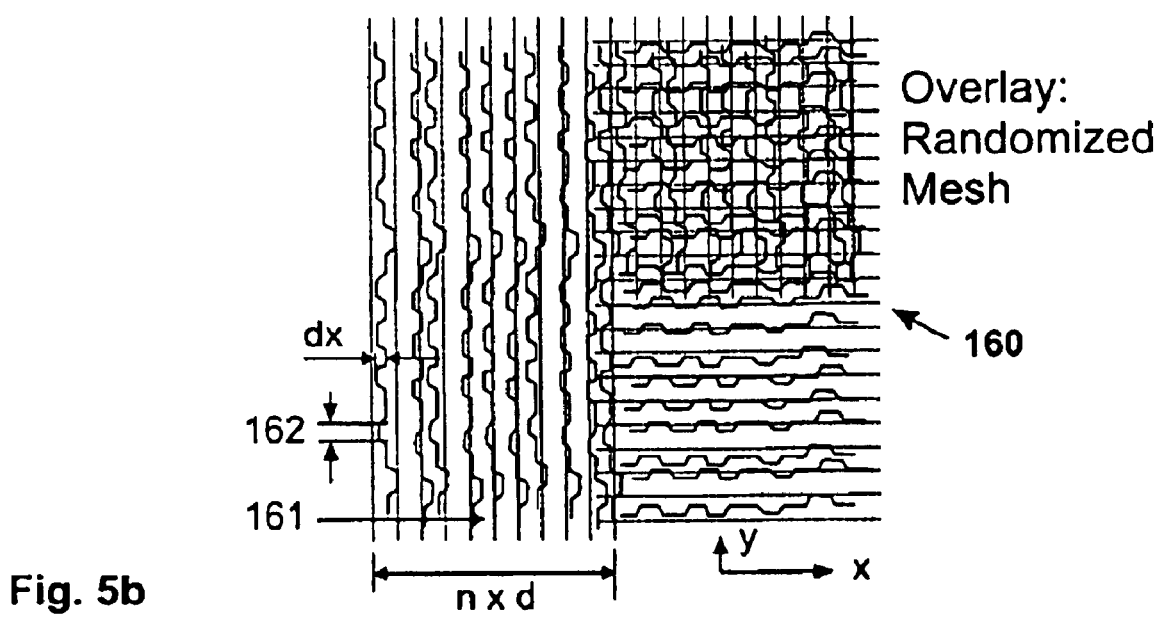
FIG. 5b shows a schematic top view of a randomly spaced conductor mesh.
Figure 5C:
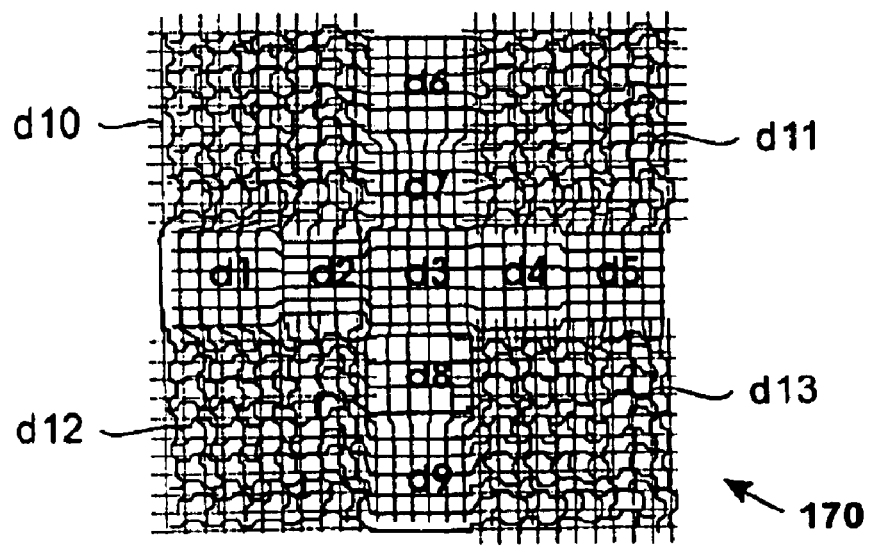
FIG. 5c shows a schematic top view of a randomly spaced conductor mesh combined with locally regular meshes with different lattice parameters.

In FIG. 5c an example of such a randomized mesh 170 is illustrated. The mesh 170 is a locally regular mesh with areas d1 d9 that differ in their pitch. The intensity distributions of these areas d1 d9 add up to a total less concentrated, i.e. more evenly distributed intensity distribution. This distribution again is combined with the intensity distribution of the randomized mesh areas d10–d13 that renders the total intensity distribution more even and hence a better approach to a totally flat intensity distribution. The mesh structures of FIGS. 5a to 5c can be used for any of the electrodes in the LCD display.

When laterally inhomogeneous meshes 60 are used as the pixel electrode, however, the homogeneity of the electric field between the upper and lower electrodes can suffer. Calculations show that assuming a thickness of 450 nm for a SiNx insulator on polysilicon, the field homogeneity at the bottom of the liquid crystal material 18 is only 70% for a 2000 nm pitch mesh with a wire diameter of 200 nm. For a thickness of the liquid crystal layer 16 of 10 microns, assuming a polyimide layer of 0.1 mm thickness, and denser arrays of lines with meshes of the order of 1000 nm, the field homogeneity is better than 95%. A beneficial effect that comes into play when meshes are smaller than the wavelength of the light is the forward scattering effect. This effect leads to a reduction of the effective width of the conductor lines because light can, to some degree, travel around the surface and avoid direct back scattering at the lines, i.e. wires. With this effect one can increase the total transmittivity to levels higher than those given by the geometrical ratio between open and metal covered areas. This will relieve some of the constraints given by the geometrical optics.

The strong diffraction induced by a conductor mesh is unwanted. To avoid those diffraction phenomena, the spacing of conductor lines or the position of the openings can be randomized. This works for all types of patterns, i.e. grids, meshes, dots, triangles, and hexagons. Randomization of the positions xn of the lines reduces the separation of colors and distributes the higher order beams over larger angles of space. The effectiveness of this distribution of higher order beams depends on the amplitude of the randomization:

$$X_n = n*d + R(\Delta)$$

where $\Delta$ is some ratio of the pitch d of the array and R is a randomization function, n is the index of the respective conductor line, x is its position along a mesh coordinate. The effectiveness of randomization is best when the smallest pitch d is slightly more than half and less than double the pitch d of the array. With a randomization function $X_n = n*d + R(d/2.1)$ the smallest period is 0.52 d and the largest period is 1.48 d.

In FIG. 5a an example of a mesh 60 with horizontal conductor lines 61 randomized around the same period d as the regular, non randomized vertical conductor lines 62 is shown. The position of the conductor lines 61 is randomly varied around their average position to minimize the cooperative diffraction through correlation with neighboring conductor lines 61.

FIG. 5b is a schematic top view of a randomly spaced mesh 160. On the left hand side, a vertical grating and on the lower right hand corner a horizontal grating are shown. The resulting overlay of the vertical grating and the horizontal grating is schematically depicted in the upper right hand corner of FIG. 5b. An improved randomization not only includes the average position of the conductor lines but also changes their linearity over distances longer than the wavelength of light. The two dimensional mesh 160 has an improved randomization where a previously straight line is broken up into line segments 162 with a variable length l where each line segment 162 is laterally displaced from a neutral position by a value dx. The average length la of the line segments 162 is approximately two to four times the wavelength of light, randomized according to $$l = R(la).$$

The lateral displacement dx of the line segments 162 is created by $$dx = R(d/2.1)$$

where dx is the average pitch of the non randomized lattice. To have randomness in both directions x, y, the starting points xn, yn 161 of the line segments 162 are also randomized according to:

$$X_n = n*d + R(d/2) \text{ and } Y_n = m*d + R(d/2).$$

Repetitions in the randomization protocol may be avoided for length scales below the coherence length of the light used. Repetitions beyond 50–100 $\mu$m will not cause diffractive phenomena for any light source.

In addition to providing a homogeneous field across an LCD pixel, the counter electrode and, possibly, the pixel electrode, may spread the directed light over the desired viewing angle. Scatterers, like conductor grids with a 200 nm diameter, disperse light over large viewing angles, e.g. 90 degrees. The openings of the meshes e.g. the 1000 nm sized areas also contribute to scattering but with a smaller spreading function, e.g. 90% intensity at 90 degrees. This scattering function is a smooth transition between the maximum at zero degrees and the minimum at 90 degrees when there is no periodic structure within the coherence length of the light.

Diffraction or scattering can be extended from a single sphere or cylinder to a system with any number of objects provided they are randomly distributed, within the coherence length of the light used and separated from each other by distances that are large compared to the wavelength. The combination of the mesh diameters, the average lattice parameters, and the randomization protocol thus allows to determine the angular function of the light emitted towards the user to create a flat intensity distribution in the viewing field and to define a cutoff outside of the viewing field.

Orientations within liquid crystals are known to propagate from an alignment nucleus into the bulk over several micrometers. Printed and etched or printed and plated arrays of mesoscale wires, having a width <<1 $\mu$m and a pitch <1 $\mu$m, as it has been proposed for wire grid polarizers, can create the preferential alignment nuclei for the formation of a homogeneous liquid crystal alignment in a display.

Figure 6:
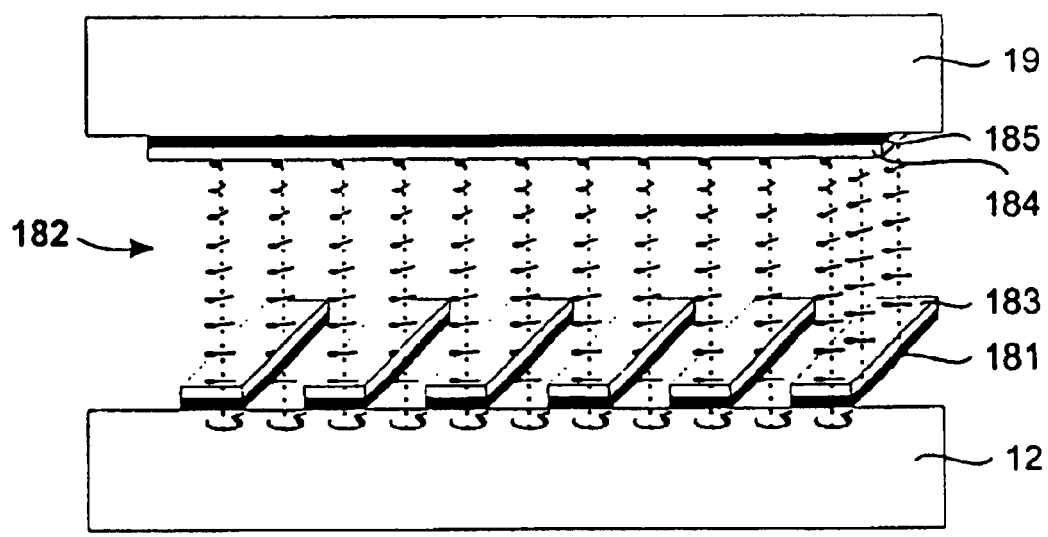
FIG. 6 shows a schematic cross section of an LCD structure with wire grid arrays and SAM covers.

In FIG. 6 an example therefor is illustrated. The pattern in the mesoscale wires 181 creates the anisotropy to control the azimutal alignment of the liquid crystal molecules 182. The planar alignment of the liquid crystals 182 is mediated by a SAM cover 183 over the wire grid polarizer array 181 and another SAM cover 184 on the counter electrode 185. The transparent wire grid polarizer array 181 eliminates the need for an opaque pixel electrode and also creates the electrical connection to the row and column electrodes or the TFT gates. Use of known odd/even effects in the SAM cover 183 is useful to decouple alignment and polarization vectors. An additional beneficiary effect from the SAM cover 183 is its low surface energy that prevents accumulation of defects. Variation of the SAM cover 183 within the pixel may provide a novel way to improve the overall performance of liquid crystal displays especially with respect to viewing angles.

Liquid crystal alignment can be combined with the transparent electrode function, with the polarizing function, and with the diffuser or scattering function.

The polarization ratio i.e. the ratio of adsorption of TM polarized light to TE polarized light, is generally low for visible light. Improvement of the performance may be obtained by oblique evaporation of the conductor and etching of structures with tapered sidewalls. Metal films evaporated under an oblique angle show a preferential transparency for TM polarized light and thus help to optimize the polarization ratio and transparency for TM polarized light. Tapered structures, i.e. slanted side walls of the structures, may provide additional means to optimize the anchoring of liquid crystal molecules and the polarization ratio.

Figure 7:
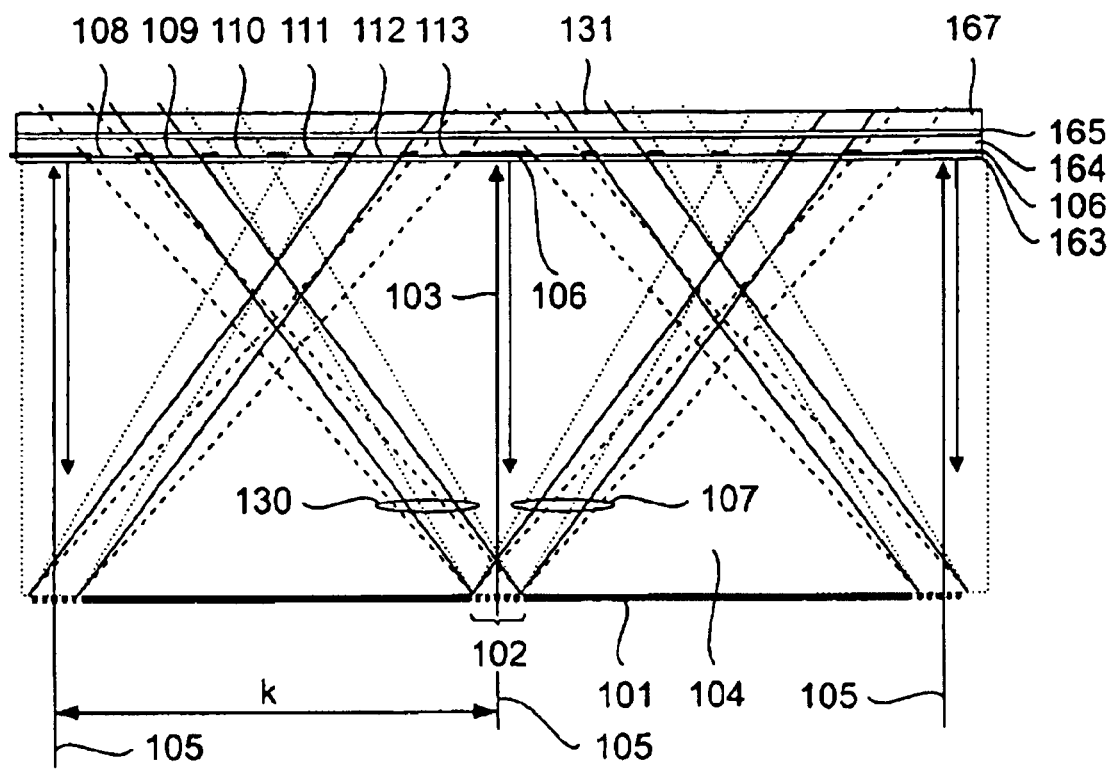
FIG. 7 shows a schematic cross section of an LCD structure with a mesh providing strong diffraction for color separation.

In FIG. 7 an embodiment of an LCD display 100 is illustrated, wherein the strong diffraction of light at a double slit or at a conductor mesh 102 is a desirable effect and can be used to eliminate the need for color filters used in conventional LCDs. In this scheme, a conductor layer 101 comprises the conductor mesh 102 acting as transparent optical diffraction grating. The angle a of tilt from the vertical axis for the first diffraction maximum of such a diffraction grating is defined via $$\sin \alpha = \lambda/dg$$

where $\lambda$ is the wavelength of the light and dg is the center to center spacing of the diffraction lines. Selecting a 3900 nm spacing dg for the diffraction grating 102, the angles a for the first maxima are 10.3, 8.1, and 5.9 degrees for red 108, green 109 and blue 110, respectively, with the horizontal offsets through a 1.1 mm transparent plate 104 being 194, 152, and 101 microns, respectively. Light 105 passing the diffraction grating 102 without diffraction also called the zero order peak 103 is reflected by the black matrix 106 back to the conductor layer 101 to be diffracted again and thus improving the overall yield in the first order peaks. The LCD display may comprise a layer with lenses, a diffusion layer, or a layer with conductor structures, e.g. comprising round scatterers, in order to achieve the desired viewing angle.

The LCD cells, respectively pixels, are vertically defined by the molecular layer 164 sandwiched between the substrate 104, the pixel electrode 163, and the blocking layer 106 on one side and the cover plate 167 and the counter electrode 165 on the other side.

For a two dimensional diffraction grating 102 and diffraction in only one axis, the second mesh dimension should have random line spacing to avoid or average out an optical diffraction activity. The three different wavelengths R, G, B are then diffused individually by the pixel electrode, e.g. the electrode formed by the conductor layer 71 in FIG. 3, or collectively by another diffusing layer, e.g. the diffusion layer 82 in FIG. 3, before emission to the front of the display, to ensure an appropriate color perception. The diffusing layers can also be used to control the viewing angle of the display and can be changed according to the specific requirements. The total fraction of energy transmitted to the observer via the first diffraction maximum is increased by reflecting order maxima back to the plane of the backlight. Higher order maxima can be prevented by selection of appropriate ratios of slit width and mesh spacing. For a pixel width of e.g. 42 $\mu$m, a lensing element could accept light on a 42 $\mu$m lateral dimension. The spectral selectivity is calculated as the solid angle of the lens seen from the pixel plane, i.e. here 42 $\mu$m at a distance of 1.1 mm or 1.6 degrees. For a diffraction angle of 10.3 degrees for the red light, the spectral selectivity is of the order of 1:8. The spectral selectivity can be increased by use of a different pitch in the diffraction grating 102 on the left and right side of the pixel. This allows to create a focusing effect.

A disadvantage of the embodiment described above is the efficiency of how the initial light intensity is used: for each pixel the light 105 is split into its spectral components and only the intensity of the first maximum on one side can be used for emission through the transparent cover plate. A more efficient use of the light 105 can be achieved if a diffraction takes place at the bottom of the transparent substrate, so that the individual RGB pixels are only addressed by the respective light. In an optimal embodiment, light from the left first diffraction maximum 130 and the right first diffraction maximum 107 could be used, as schematically illustrated in FIG. 7. The light 105 is received from a light source and travels through the diffraction grating 102 that provides for a diffraction. A zero order peak light 103 is generated at the diffraction grating 102. This zero order peak light 103 is in the present embodiment blocked by a blocking layer 106. The left first diffraction maximum 130 and the right first diffraction maximum 107 comprise the three color components R 108, 113, (dashed lines), G 109, 112 (solid lines), and B 110, 111 (dotted lines), respectively. Each color component addresses an individual pixel 108–113.

A problem is the reflection and the reuse of the zero order peak light 103 intensity to avoid unwanted display effects and to optimize the efficiency. Higher order maxima are not a problem because they can be suppressed by the appropriate ratio of slit width and mesh spacing k, respectively. The pixel electrode mesh (not visible) could then be re-designed to be used as a polarizer. An appropriate pattern is provided on the surface 131 of the cover plate 167 to allow a homogeneous diffusion of all three wavelengths R, G, B.

The diffuser function could also be implemented in the counter electrode 165 by using 0.2 0.5 mm sized round scatterers.

The diffusing layers are used to control the viewing angle of the display. The total fraction of energy transmitted to the viewer is increased when the reflected light from the zero order peak can be recycled in the substrate. An additional improvement may be achieved when light with wrong polarization is reflected from wire grid polarizers instead of being absorbed.

Light Separation Device

Figure 8A:
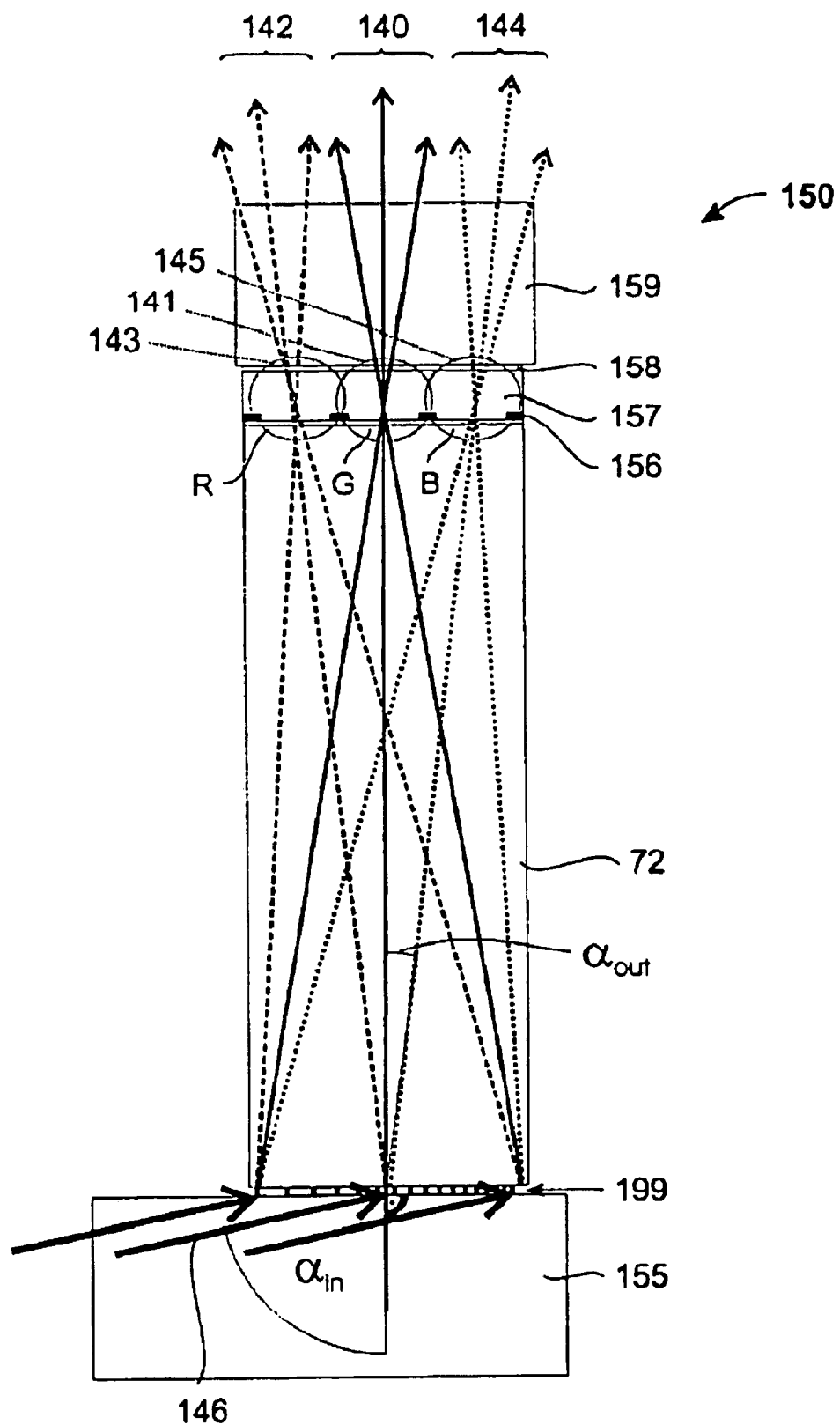
FIG. 8a shows a schematic cross section of an LCD structure with a focusing grating structure for color separation.

In FIG. 8a, another preferred embodiment is depicted, comprising an LCD display 150 with a high yield light separation. It comprises a substrate plate 72 with a second refractive index n2 and a color separation and focusing grating layer 199, e.g. a chirped grating, i.e. a variable pitch focused grating, formed below the transparent substrate plate 72. A backlight medium 155 is situated below the color separation and focusing grating layer 199. The backlight medium 155 has a first refractive index n1. The color separation and focusing grating layer 199 with the chirped grating provides for a diffraction which separates the red, green, and blue light components. It focuses the green light components 140 (solid lines) onto a sub-pixel 141 of the display 150, the red light components 142 (dashed lines) onto a sub-pixel 143, and the blue light components 144 (dotted lines) onto a sub-pixel 145. In other words, the focusing grating layer 199 serves as a grating type color separator. In the present embodiment, the light 146 from a light source (not shown) is received by the structured lower plane of the focusing grating layer 199 at a gazing angle $\alpha_{in}$.

The LCD display 150 further comprises a pixel electrode layer 156, ideally including a polarizing function and liquid crystal alignment, plus a TFT structure, a liquid crystal layer 157, a counter electrode layer 158, ideally including a polarizing function and liquid crystal alignment, and a cover plate 159.

Figure 8B:
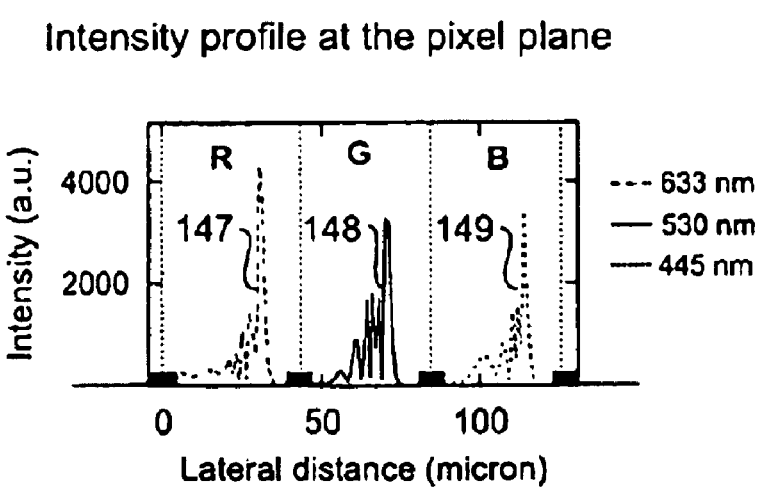
Figure 8C:
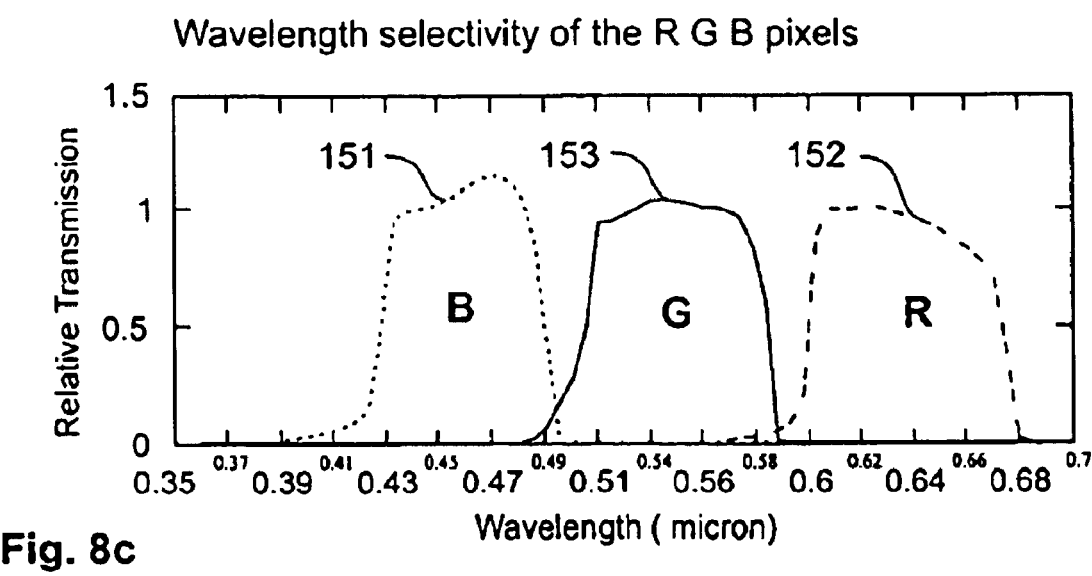

In FIG. 8b, the intensity profile at the pixel plane, inside the sub pixels 141, 143, 145, of the LCD display 150 is illustrated. The intensity profile 147 of the red light component 142 is shown on the left, the intensity profile 148 of the green light component 140 in the middle, and the intensity profile 149 of the blue light component 144 on the right. The corresponding wavelength selectivity of the sub pixels 141, 143, and 145 is depicted in FIG. 8c. The dotted curve 151 represents the selectivity of the "blue" pixel 145, the curve 152 represents the selectivity of the "red" pixel 143, and the curve 153 represents the selectivity of the "green" pixel 141.

The focusing grating layer 199 is selected such that a separation of R, G, and B is obtained that matches the distance of the sub-pixels 141, 143, and 145. The light exits the cover plate 159. A diffusion layer or any other layer might be employed that allows to define the viewing angle.

According to the embodiment of an LCD display 150 illustrated in FIG. 8a, a focusing grating layer 199, also referred to as conductor grating layer, is employed for high yield color separation. It separates the white light 146 into its R, G and B wavelength bands 142, 140, 144, respectively, and focuses these wavelength bands R, G, B to the corresponding R, G, B sub pixels 143, 141, 145, respectively. The conductor grating layer 199 containing the focusing grating is aligned with the layer defining the pixels 143, 141, 145. One column of the focusing grating layer 199 is provided for each column of pixel triplets in a defined distance. The LCD display 150 uses illumination by parallel light at the gazing angle ain. The incoming light 146 is diffracted by the focusing conductor grating layer 199 and the first order peaks of the different wavelength bands are directed, i.e. focused, to the corresponding R, G, B sub pixels 143, 141, 145.

The working principle of the focusing grating layer 199 is a combination of a diffractive effect with Fresnel lensing. This is achieved by a variable pitch of the grating so that from each position of the grating the first order of the diffracted R, G, and B light is directed to a corresponding R, G, and B window. In general, the pitch of the focusing grating layer 199 may vary in a non linear fashion, but for ease of design it can be approximated in a linear way. The angle of the zero order transmitted light is large enough that it may be reflected or absorbed by appropriate layers. Diffraction orders higher than one are not a problem because their angles are even higher. The focusing grating layer 199 also has a polarizing effect.

Whether a grating type color separator can be used with similar backlight intensities as current displays, depends on the relative amount of light that can be collected and focused on the R, G and B pixels. The maximal footprint per pixel and also for a grating separator is given by the spacing of the display pixel cell, i.e. 126 microns for an RGB triplet. The quality of a grating increases with the number of lines. In the present embodiment, gratings with 32 and 66 lines are implemented for 3.9 and 1.9 µm pitches, respectively. The maximum for the relative amount of energy that can be collected in the first diffraction peak is 38% for a slit width of 1.7 µm and a grating with a 3.9 mm pitch mesh. This is multiplied with the geometrical aperture ratio of the grating (1.7/3.9) and becomes 17%. Because light is collected by the grid over a three times larger area than in the standard approach, the effective overall light intensity will be 51%.

For an example of 42 µm wide sub pixels, and the direction of the incident light tilted 80 degrees versus the surface normal, the average pitch of the grating is about 540 nm. In general, the pitch may vary in a non linear fashion, but for ease of design it can be approximated in a linear way, in the proposed example from 680 nm at the limiting edge below the red sub pixel to 415 nm at the limiting edge below the blue sub pixel. The layer between the focusing grating 199 and the plane defining the pixels has a thickness of 400 µm and a refractive index of 1.5.

Figure 9:
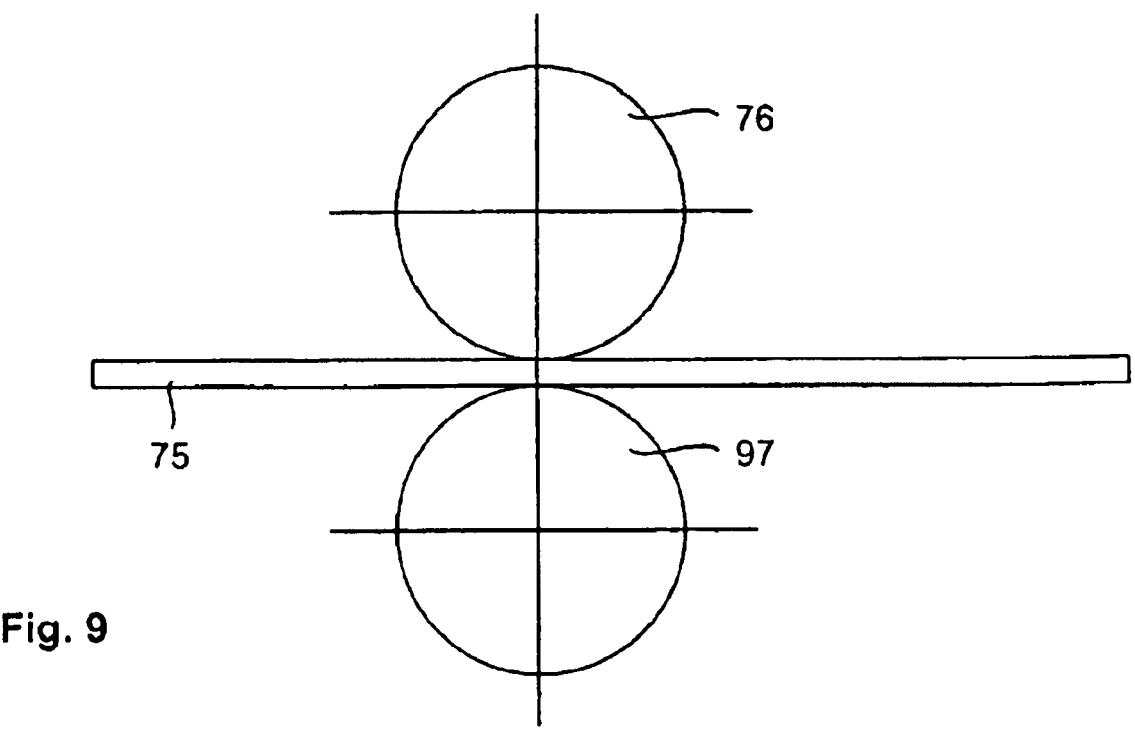
FIG. 9 shows a schematic cross section of an apparatus for manufacturing conductor structures on opposite sides of a substrate.

With a print and plate process, the gate lines, the meshes serving as pixel electrodes with polarizing function on the top of a transparent substrate 75, and the diffraction grating on the bottom of the transparent substrate 75 can be fabricated in one pre-aligned printing step, as schematically illustrated in FIG. 9. For this purpose, two cylindrical stamps 76, 97 are employed which are designed to transfer a catalyst, e.g. Pd, onto the opposing surfaces of the transparent substrate 75. The cylindrical stamp 76 forms a catalyst pattern for the subsequent plating of the gate lines and pixel electrode, and the cylindrical stamp 97 forms a catalyst pattern for the subsequent plating of the grating layer.

The main problem that is solved before simultaneous printing of large patterns, e.g. the gate lines, and small patterns, e.g. the conductor mesh serving as pixel electrode, can become an industrial process, is the master fabrication. A method is herein proposed where the gate line conductor structures 83 (see FIG. 3) are fabricated to an accuracy of one mm using standard optical lithography. The mesh in the open areas 84, usable as polarizing filter and as transparent pixel electrode, is then written using electron beam lithography. This mesh may be a 100 nm pitch mesh. Typically, electron beam systems cannot handle masters larger than 300 millimeters, i.e. 12 inch wafers. Masters for larger displays may be created with a small original e beam patterned master using a step and imprint process known in the art.

One can make a large number of LCD structures using printing. Use of a patterned conductor, e.g. silver, copper, nickel, and so forth, to form a mesh electrode eliminates the need for ITO deposition and patterning, the need for a polarizer and for alignment layers, thus allowing fabrication of passive matrix LCDs in one single step and fabrication of active matrix LCDs with a minimal number lithography steps.

The printing and electroless plating or plating, printing, and etching of gate lines with pixel electrode meshes and the data structures can avoid two vacuum steps and replace two lithography steps by printing steps.

The print and electroless plating process comprises the following basic steps for the formation of a conductor layer:

a. printing a substance defining the conductor layer to be formed; and b. selectively plating the conductor layer onto the substance.

The plating, printing and etching process comprises the following basic steps for the formation of a conductor layer:

a. forming a homogeneous conductor layer;

b. printing a resist onto the conductor layer defining the conductor layer to be formed; and c. selectively removing by etching areas of the conductor layer that are not protected by the resist.

Herein several embodiments are presented that make use of electroless print and plate structures and plate, print, and etch structures to further reduce the manufacturing costs by avoiding vacuum metal deposition steps at similar or even higher performance. The teaching of the embodiments described herein can be combined because they all contribute to display production cost reduction in a concerted fashion.

In one embodiment (cf. FIG. 3, for example) it has been demonstrated that simultaneous electroless printing/plating/etching of conductor patterns and the use of transparent mesh pixel electrodes replaces one lithography step and eliminates another lithography step and one vacuum conductor deposition step.

In another embodiment it has been demonstrated that color filters can be eliminated if one uses conductor or polymer gratings on the bottom of the transparent substrate in conjunction with wire grid transparent electrodes/polarizers on the substrate. An aligned dual side processing (FIG. 9) can create colored passive matrix displays with one printing step, i.e. substrate with bottom color separator and polarizer pixel electrode; cover plate with polarizing counter electrode and top diffuser. Different variants of light separation devices are presented that rely on gratings or imprinted polymer structures. This allows replacement of lithography steps.

In yet another embodiment (FIG. 8a) it has been demonstrated that color filters can be eliminated by using chirped conductor or polymer gratings on the waveguide or on the bottom of the transparent substrate.

In another embodiment the usage of conductor gratings as polarizers and dot like conductor structures as diffusers is proposed. In another embodiment the usage of conductor gratings as alignment layers for liquid crystals is proposed.

The main advantage of integrating polarizing capability into the pixel electrode and combining focusing and color separation into a grating directly onto the supporting substrate or backlight is a much more compact display that is also simpler and cheaper to fabricate. The combination and integration of several functions eliminates many lithography steps, assembly steps and alignment steps.

With the introduction of LCD displays having lateral resolution of pixels equal or larger than of comparable CRT displays, the only part where LCD displays are still inferior are maximal brightness and halftone resolution, i.e. dynamic range. The driving stability of LCDs is limited to approx. 1.5% by the leaking of transistors and by the small pixel capacitance. The main factor deciding the stability is the capacitor. It cannot be made larger without reducing the aperture ratio, which then would reduce the maximal brightness of the display. With appropriate capacitors the performance of LCD can become as good as CRT displays also in terms of brightness and halftone resolution, allowing take-over of the high performance market.

Any disclosed embodiment may be combined with one or several of the other embodiments shown and/or described. This is also possible for one or more features of the embodiments.

It is obvious that a person skilled in the art can modify the shown arrangements in many ways without departing from the gist of the invention which is encompassed by the subsequent claims.

What is claimed is:

1. Liquid crystal display device comprising:
   a substantially transparent substrate layer between a grating layer and a pixel electrode that comprises solid conductor and an electrically conductive mesh,
   a liquid crystal layer between said pixel electrode and a substantially transparent counter electrode that is arranged at a transparent cover plate,
   an active circuit element, layer with a field effect transistor for controlling the pixel electrode.

2. Liquid crystal display, device according to claim 1, further comprising a light source for emitting light at a plurality of wavelength bands (R, G, B).

3. Liquid crystal display device according to claim 2, wherein the grating layer provides for a diffraction of the light.

4. Liquid crystal display device according to claim 1, wherein the electrically conductive mesh is connected to a gate of the field effect transistor.

5. Liquid crystal display device according to claim 1, wherein the electrically conductive mesh has a polarizing function for the light.

6. Liquid crystal display device according to claim 1, wherein the electrically conductive mesh comprises rows and/or columns of randomly spaced conductor lines.

7. Liquid crystal display device according to claim in 1, wherein the liquid crystal layer comprises pillars or spacer balls.

8. Liquid crystal display device according to claim 1, wherein the counter electrode has a polarizing function for the light.

9. Liquid crystal display device according to claim 1, comprising an alignment layer for the alignment of liquid crystals in the liquid crystal layer.

10. Liquid crystal display device according to claim 1, wherein at the cover plate a diffusion layer is arranged.

11. Liquid crystal display device according to claim 1, wherein the grating layer comprises a chirped grating for providing for a separation of waveband components with different color.

12. Liquid crystal display device according to claim 11, wherein the grating layer is designed to focus the waveband components with different color onto individual pixels.

13. Liquid crystal display device according to claim 1, wherein the grating layer and/or the pixel electrode, comprise an electroless deposited (ELD) conductor.

14. Liquid crystal display device according to claim 1, wherein the pixel electrode has a transmittivity above 84%.

15. Liquid crystal display device according to claim 1, comprising a blocking layer for blocking a zero order wavelength band of the light.

16. Display comprising a liquid crystal display device, said liquid crystal display comprises:
   a substantially transparent substrate, layer between a grating layer and a pixel electrode that comprises a solid conductor and an electrically conductive mesh,
   a liquid crystal layer between said pixel electrode and a substantially transparent counter electrode that is arranged at a transparent cover plate, and
   an active circuit element layer with a field effect transistor for controlling the pixel electrode.

* * * * *